United States Patent
Parameshwaran

(10) Patent No.: US 10,198,772 B2
(45) Date of Patent: Feb. 5, 2019

(54) DRIVER ASSESSMENT AND RECOMMENDATION SYSTEM IN A VEHICLE

(71) Applicant: Tata Consultancy Services Limited, Mumbai (IN)

(72) Inventor: Reni Parameshwaran, Kochi (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/644,584

(22) Filed: Mar. 11, 2015

(65) Prior Publication Data

US 2016/0203560 A1 Jul. 14, 2016

(30) Foreign Application Priority Data

Jan. 14, 2015 (IN) ............................ 137/MUM/2015

(51) Int. Cl.
*G06Q 40/08* (2012.01)
*G01S 13/02* (2006.01)
(Continued)

(52) U.S. Cl.
CPC .............. *G06Q 40/08* (2013.01); *G01S 13/02* (2013.01); *G01S 17/02* (2013.01); *G01S 19/13* (2013.01);
(Continued)

(58) Field of Classification Search
CPC .... G06Q 40/08; G06Q 30/0218; G01S 19/13; G01S 17/02; G01S 13/02; G01S 19/48;
(Continued)

(56) References Cited

U.S. PATENT DOCUMENTS 8,577,703 B2 * 11/2013 McClellan ............. G06Q 40/02
705/7.11
8,595,037 B1 11/2013 Hyde et al.
(Continued)

OTHER PUBLICATIONS

Ahmad Aljaafreh, "Web Driving Performance Monitoring System," World Academy of Science, Engineering and Technology, vol. 6 Oct. 28, 2012, Oct. 28, 2012, pp. 10-14 (5 pages).
(Continued)

*Primary Examiner* — Courtney D Heinle
(74) *Attorney, Agent, or Firm* — Finnegan, Henderson, Farabow, Garrett & Dunner LLP

(57) ABSTRACT

System and method for assessing liability/accountability of a driver or a driver assistance technology in a vehicle is disclosed. One or more components used to assist a driver and to collect information of the driver and the vehicle is identified. The one or more components comprise driver assistance technologies and on-board diagnostic systems. After identifying, the information is analyzed to create a plurality of scenarios based on one or more factors. Subsequently, a first score and a second score is calculated corresponding to activation of each of the driver assistance technologies and the driving behavior in the plurality of driving scenarios. Subsequently, the plurality of driving scenarios is classified into one of a technology priority mode and a driver priority mode based on the analysis, the first score and the second score. Based on the classification, a liability of the driver/driver assistance technology is assessed and recommendations are processed.

6 Claims, 7 Drawing Sheets

(51) Int. Cl.
*G01S 17/02* (2006.01)
*G01S 19/13* (2010.01)
*G01S 19/48* (2010.01)
*G06Q 30/02* (2012.01)
*G01S 13/93* (2006.01)

(52) U.S. Cl.
CPC .......... *G01S 19/48* (2013.01); *G06Q 30/0218* (2013.01); *G01S 13/931* (2013.01); *G01S 2013/9364* (2013.01); *G01S 2013/9367* (2013.01)

(58) Field of Classification Search
CPC ........... G01S 13/931; G01S 2013/9364; G01S 2013/9367
See application file for complete search history.

(56) References Cited

U.S. PATENT DOCUMENTS

| | | | | |
|---|---|---|---|---|
| 9,355,423 | B1* | 5/2016 | Slusar | G06Q 40/08 |
| 9,390,451 | B1* | 7/2016 | Slusar | G06Q 40/04 |
| 2013/0218604 | A1* | 8/2013 | Hagelstein | G06Q 40/08 705/4 |
| 2013/0304513 | A1* | 11/2013 | Hyde | G06Q 40/08 705/4 |
| 2013/0304514 | A1* | 11/2013 | Hyde | G06Q 40/08 705/4 |
| 2014/0148972 | A1* | 5/2014 | Basir | G07C 5/0841 701/1 |
| 2014/0172467 | A1* | 6/2014 | He | B60K 28/066 705/4 |
| 2014/0257870 | A1* | 9/2014 | Cielocha | G07C 5/00 705/4 |
| 2015/0025917 | A1* | 1/2015 | Stempora | G06Q 40/08 705/4 |
| 2015/0187013 | A1* | 7/2015 | Adams | G06Q 30/0283 705/4 |
| 2015/0187019 | A1* | 7/2015 | Fernandes | G06Q 40/08 705/4 |
| 2016/0086285 | A1* | 3/2016 | Jordan Peters | G06Q 40/08 705/4 |
| 2016/0167652 | A1* | 6/2016 | Slusar | B60W 30/143 701/27 |
| 2016/0225095 | A1* | 8/2016 | Biemer | G06Q 40/08 705/4 |

OTHER PUBLICATIONS

Tomer Toledo and Tsippy Lotan, "In-Vehicle Data Recorder for Evaluation of Driving Behavior and Safety," Transportation Research Record: Journal of the Transportation Research Board, No. 1953, Transportation Research Board of the National Academies, Washington, D.C., 2006, pp. 112-119 (8 pages).

"Telematics Drive Big Changes in Auto Insurance Industry," Privacy Risk Advisors, retrieved from http://www.privacyrisksadvisors.com/privacy-and-telematics/ on Mar. 9, 2015 (15 pages).

* cited by examiner

DRIVER ASSESSMENT AND RECOMMENDATION SYSTEM IN A VEHICLE

CROSS REFERENCE TO RELATED APPLICATIONS

This U.S. patent application claims the benefit of priority under 35 U.S.C. § 119 to India Patent Application No. 137/MUM/2015 filed on Jan. 14, 2015. The aforementioned application is incorporated herein by reference in its entirety.

TECHNICAL FIELD

The present disclosure in general relates to assessing driving events. More particularly, the present disclosure relates to a system and method for assessing liability of a driver in a vehicle.

BACKGROUND

Today, automobile manufacturers are adopting driver assistance technologies to assist a driver in a vehicle. As known, the driver assistance technologies may include adaptive cruise control, collision warning system, and automated braking systems. The adaptive cruise control is used in the vehicles with an automatic transmission. The adaptive cruise control typically adjusts a speed of the vehicle to maintain a set vehicle speed and adjusts the speed of the vehicle to maintain a predetermined distance from another vehicle. Similarly, other driver assistance technology assists the driver to run the vehicle.

As the driver assistance technologies are evolving, a liability of risk associated with driving the vehicle has shifted from the driver to driver assistance technology. When the driver assistance technology is used in combination with the driver driving the vehicle, the risk may be shared between the driver and the driver assistance technology. For example, when the driver assistance technology is in use and the driver supersedes controls of the driver assistance technology to run the vehicle, the driver may be liable for any risk possessed during the drive. In another example, when the driver assistance technology takes control of the vehicle such as in self-driving or autonomous vehicles, the driver assistance technology may be liable for any risk possessed during the drive. Similarly, when the driver is driving the vehicle, the driver may be liable for the risk possessed during the drive.

The risk possessed by the driver and the driver assistance technology may be assessed by insurance companies. Assessing the risk using the information collected by the driver assistance technology and other systems is a computationally complex task as the amount of the information may be huge and the information may continuously vary. Moreover, the factors to be considered for assessing the risk may differ according to the driving conditions.

SUMMARY

This summary is provided to introduce concepts related to systems and methods for assessing liability of a driver or a driver assistance technology in a vehicle and the concepts are further described below in the detailed description. This summary is not intended to identify essential features of the claimed subject matter nor is it intended for use in determining or limiting the scope of the claimed subject matter.

In one implementation, a method for assessing liability/accountability of a driver or a driver assistance technology in a vehicle is disclosed. The method comprises identifying, by a processor, one or more components used to assist a driver and to collect information of the driver and the vehicle. The one or more components comprise driver assistance technologies and on-board diagnostic systems. The driver assistance technologies assist the driver. The on-board diagnostic systems collect the information corresponding to a driving behaviour of the driver. The method further comprises analyzing, by the processor, the information to create a plurality of driving scenarios. The plurality of scenarios is created based on one or more factors. In one example, the one or more factors comprise a location, a time, and a weather condition. The method further comprises calculating, by the processor, a first score and a second score for each of the plurality of driving scenarios. The first score is calculated corresponding to each of the driver assistance technologies in the plurality of driving scenarios. The second score is calculated based on the driving behaviour in the plurality of driving scenarios. The method further comprises classifying, by the processor, the plurality of driving scenarios into one of a technology priority mode and a driver priority mode based on the analysis, the first score and the second score. The technology priority mode indicates use of the driver assistance technologies for running the vehicle. The driver priority mode indicates the vehicle is driven by the driver. The method further comprises assessing, by the processor, a liability/accountability of the driver or the driver assistance technologies, in an event, based on the classification. The method further comprises assigning a weightage to one or more parameters of the driver assistance technologies. The method further comprises processing recommendations to the driver based on the classification of the plurality of driving scenarios. The method further comprises checking acceptance of the recommendations processed. The method further comprises calculating insurance for the driver based on the assessment and the recommendations provided. The method further comprises providing a discount to the driver based on the acceptance of the recommendations.

In one implementation, a system for assessing liability/accountability of a driver or a driver assistance technology in a vehicle is disclosed. The system comprises a memory and a processor coupled to the memory. The processor is capable of executing program instructions stored in the memory. The processor executes the program instructions to identify one or more components used to assist a driver and to collect information of the driver and the vehicle. The one or more components comprise driver assistance technologies and on-board diagnostic systems. The driver assistance technologies assist the driver. The on-board diagnostic systems collect the information corresponding to a driving behaviour of the driver. The processor further executes the program instructions to analyze the information to create a plurality of driving scenarios. The plurality of scenarios is created based on one or more factors. In one example, the one or more factors comprise a location, a time, and a weather condition. The processor further executes the program instructions to calculate a first score and a second score for each of the plurality of driving scenarios. The first score is calculated corresponding to each of the driver assistance technologies in the plurality of driving scenarios. The second score is calculated based on the driving behaviour in the plurality of driving scenarios. The processor further executes the program instructions to classify the plurality of driving scenarios into one of a technology priority mode and a driver priority mode based on the analysis, the first score and the second score. The technology priority mode indicates use of the driver assistance technologies for running the vehicle. The driver priority mode indicates the vehicle is driven by the driver. The processor further executes the program instructions to assess a liability/accountability of the driver or the driver assistance technologies, in an event, based on the classification.

In one implementation, a non-transitory computer readable medium embodying a program executable in a computing device for assessing liability/accountability of a driver or a driver assistance technology in a vehicle is disclosed. The program comprises a program code for identifying one or more components used to assist a driver and to collect information of the driver and the vehicle. The one or more components comprise driver assistance technologies and on-board diagnostic systems. The driver assistance technologies assist the driver. The on-board diagnostic systems collect the information corresponding to a driving behaviour of the driver. The program further comprises a program code for analyzing the information to create a plurality of driving scenarios. The plurality of scenarios is created based on one or more factors. In one example, the one or more factors comprise a location, a time, and a weather condition. The program further comprises a program code for calculating a first score and a second score for each of the plurality of driving scenarios. The first score is calculated corresponding to each of the driver assistance technologies in the plurality of driving scenarios. The second score is calculated based on the driving behaviour in the plurality of driving scenarios. The program further comprises a program code for classifying the plurality of driving scenarios into one of a technology priority mode and a driver priority mode based on the analysis, the first score and the second score. The technology priority mode indicates use of the driver assistance technologies for running the vehicle. The driver priority mode indicates the vehicle is driven by the driver. The program further comprises a program code for assessing a liability/accountability of the driver or the driver assistance technologies, in an event, based on the classification.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like/similar features and components.

DETAILED DESCRIPTION

Figure 1:
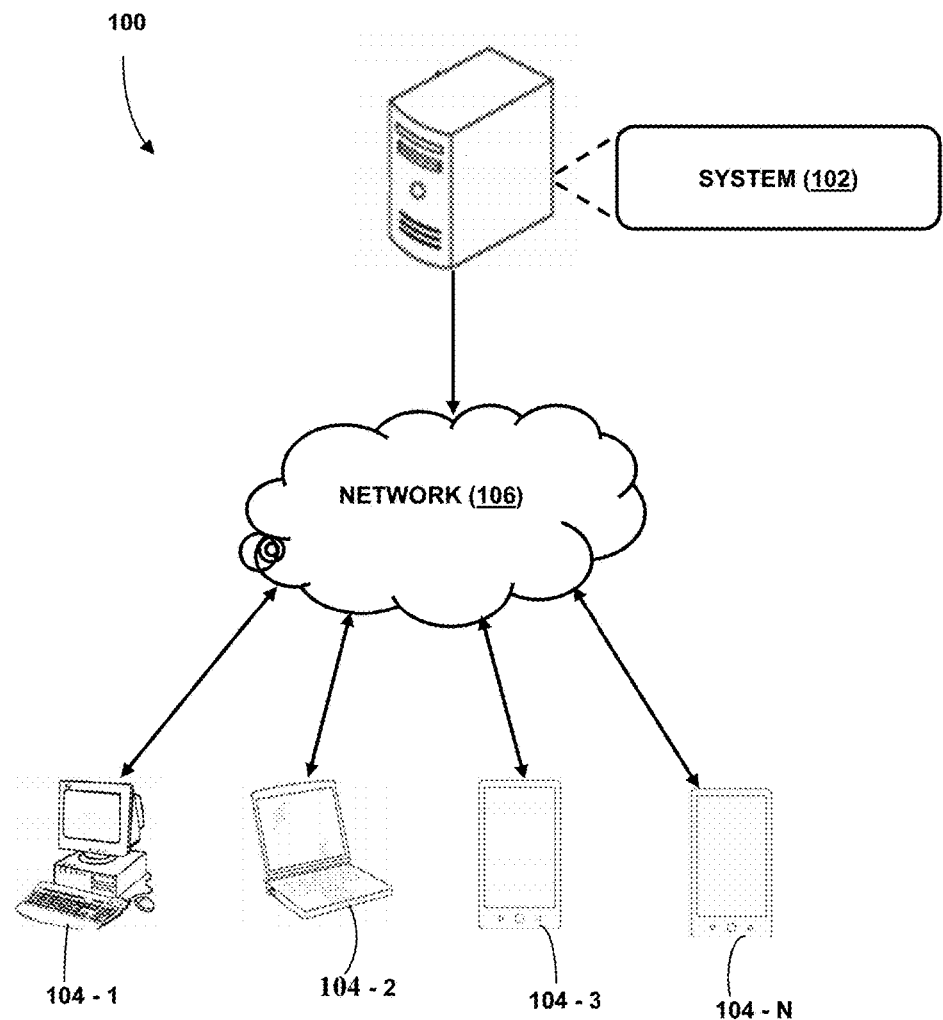
FIG. 1 illustrates a network implementation of a system for assessing liability of a driver or a driver assistance technology in a vehicle, in accordance with an embodiment of the present disclosure.

The present disclosure relates to a system and a method for assessing a liability/accountability of a driver or a driver assistance technology in a vehicle. At first, one or more components used to assist a driver and to collect information of the driver and the vehicle may be identified. The one or more components may comprise driver assistance technologies and on-board diagnostic systems. The driver assistance technologies may assist the driver. In one example, the driver assistance technologies may comprise one of an adaptive cruise control, a standard cruise control, an automated braking system, a collision avoidance system, and a driver drowsiness detection system. The on-board diagnostic systems may collect the information corresponding to a driving behaviour of the driver. In one example, the on-board diagnostic systems may comprise a plurality of sensors such as an accelerometer, a gyroscope, Inertial Navigation System (INS), Micro-Electro-Mechanical Systems (MEMS), and Global Positioning System (GPS).

After identifying the one or more components, the information may be analysed to create a plurality of driving scenarios. In one example, the driving scenarios are created based on one or more factors such as location, weather, traffic, etc. For each of the plurality of driving scenarios, a first score and a second score may be calculated. The first score may be calculated corresponding to each of the driver assistance technologies in the plurality of driving scenarios. The second score may be calculated based on the driving behaviour in the plurality of driving scenarios. Upon analyzing, the plurality of driving scenarios may be classified into a technology priority mode and a driver priority mode based on the analysis, the first score and the second score. The technology priority mode may indicate use of the driver assistance technologies for running the vehicle. The driver priority mode may indicate the vehicle is driven by the driver. In other words, the technology priority mode indicates activating the driver assistance technology to assist the driver in the driving scenario. The driver priority mode indicates the driver driving the vehicle without taking the assistance from the driver assistance technology. Upon classifying the plurality of driving scenarios, recommendations may be processed to the driver. Based on the classification, a liability/accountability of the driver or the driver assistance technologies, in an event, may be assessed. In one embodiment, the recommendations processed to the driver may be checked for the recommendations being accepted by the driver. Based on the assessment and the recommendations provided, insurance may be calculated. Based on the acceptance of the recommendations, a discount and/or a reward may be provided to the user.

While aspects of described system and method for assessing liability/accountability of a driver in a vehicle may be implemented in any number of different computing systems, environments, and/or configurations, the embodiments are described in the context of the following exemplary system.

Referring now to FIG. 1, a network implementation 100 of a system 102 for assessing liability/accountability of a driver or a driver assistance technology in a vehicle is illustrated, in accordance with an embodiment of the present disclosure. The system 102 may identify one or more components used to assist a driver and to collect information of the driver and the vehicle. The one or more components may comprise driver assistance technologies and on-board diagnostic systems. The driver assistance technologies may assist the driver. The on-board diagnostic systems may collect the information corresponding to a driving behaviour of the driver. The system 102 may analyze the information to create a plurality of driving scenarios. The system 102 may create the plurality of driving scenarios based on one or more factors. Subsequently, the system 102 may calculate a first score corresponding to each of the driver assistance technologies in the plurality of driving scenarios. Further, the system 102 may calculate a second score based on the driving behaviour in the plurality of driving scenarios. After creating the plurality of driving scenarios, the system 102 may classify the plurality of driving scenarios into one of a technology priority mode and a driver priority mode based on the analysis, the first score and the second score. The technology priority mode indicates activating the driver assistance technology to assist the driver in the driving scenario. The driver priority mode indicates the driver driving the vehicle without taking the assistance from the driver assistance technology. Further, the system 102 may assess a liability/accountability of the driver or the driver assistance technologies, in an event, based on the classification.

In one embodiment, the system 102 may assign a weightage to one or more parameters of the driver assistance technologies. Further, the system 102 may process recommendations to the driver based on the classification of the plurality of driving scenarios. After processing the recommendations, the system 102 may check acceptance of the recommendations processed. Based on the assessment and the recommendations provided, the system 102 may calculate insurance for the driver. Based on the acceptance of the recommendations, the system 102 may provide a discount and/or a reward to the driver.

Although the present disclosure is explained by considering that the system 102 is implemented as a software application on a server, it may be understood that the system 102 may also be implemented in a variety of computing systems, such as a laptop computer, a desktop computer, a notebook, a workstation, a mainframe computer, a server, a network server, cloud, and the like. In one implementation, the system 102 may be implemented in distributed parallel processing servers to run a variety of applications in parallel. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, a workstation, a car infotainment system, wearable devices such as wrist bands, eye wear, hear gear, and electronic devices that are connected to a vehicle such as display systems, GPS devices, electronic system coupled to mirrors of the vehicle, and the like. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
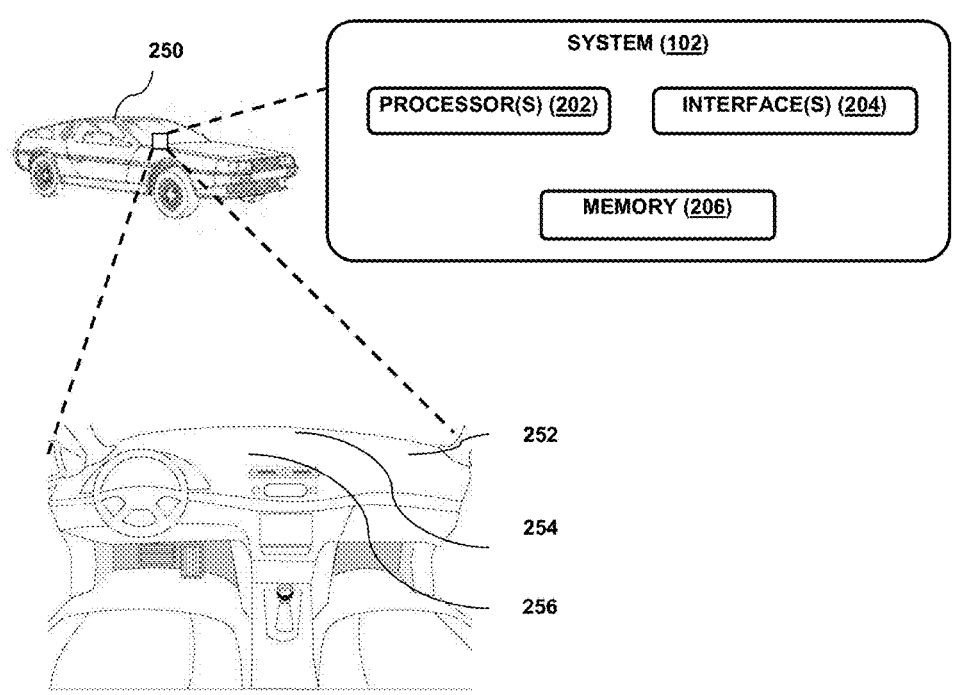
FIG. 2 illustrates the system connected to a vehicle, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, the user may use the client device 104 to access the system 102 via the I/O interface 204. The working of the system 102 may be explained in detail using FIG. 2, FIG. 3, FIG. 4, FIG. 5 and FIG. 6. The system 102 may be used to assess liability/accountability of a driver or a driver assistance technology in a vehicle 250. Referring to FIG. 2, the system 102 connected to the vehicle 250 is shown. In one implementation, the vehicle 250 may comprise one or more components 252. In order to assess liability/accountability of the driver or the driver assistance technology in the vehicle 250, the system 102 may communicate with the vehicle 250. Specifically, the system 102 may communicate with the one or more components 252 of the vehicle 250. The one or more components 252 may be used to assist the driver and to collect information of the driver and the vehicle 250. In one implementation, the one or more components 252 may comprise driver assistance technologies 254 and On-Board Diagnostic (OBD) system 256. The driver assistance technologies 254 may be used to assist the driver. The OBD systems 256 may be used to collect the information of the driver and the vehicle 250.

In one example, the system 102 may communicate with Engine Control Unit (ECU) (not shown) of the vehicle 250 to collect the information. The system 102 may communicate using wired connection or wireless connection with the ECU via ports such as OBD 256. The system 102 may communicate wirelessly with the vehicle 250 to collect the information.

In one implementation, the system 102 may communicate with a portable electronic device (not shown) present in the vehicle 250. The portable electronic device may identify the one or more components 252 in the vehicle 250. After identifying the one or more components, the system 102 may gather the information from the driver assistance technologies 254 and the OBD system 256.

The OBD system 256 may comprise a plurality of sensors. In one example, the plurality of sensors may include an accelerometer, a gyroscope, Inertial Navigation System (INS), Micro-Electro-Mechanical Systems (MEMS), a Global Positioning System (GPS), a barometer, a clock, a magnetometer, a camera, a driver presence sensor, door sensors, proximity sensors, and a camera. The plurality of sensors may collect the information pertaining to speed of the vehicle 250, maintenance warnings for the vehicle 250, detecting faults in the one or more components 252, and checking deployment of airbags in the vehicle 250. In one implementation, the vehicle 250 may comprise a portable device used to collect the information from the OBD system 256. In one example, the portable device may be a USB dongle. In one implementation, the portable device may have one or more sensors; e.g., an accelerometer, a gyroscope, a GPS, a magnetometer, a clock, a barometer, etc. In one implementation, the portable device may be wirelessly connected; e.g., the Bluetooth, Wi-Fi, with the portable electronic device present in the vehicle 250. As discussed above, the sensors in the OBD system 256 may collect information of the vehicle 250. For example, the sensors may collect the information corresponding to speed of the vehicle 250 using the accelerometer or the GPS. In one example, the sensors may collect information corresponding presence of the driver in the vehicle 250. In one example, the sensors may collect the information corresponding to braking, cornering, acceleration and jerk of the vehicle 250 using the plurality of sensors. In another example, the sensors may collect information corresponding to the driver assistance technologies 254 being used in the vehicle 250. Further, the sensors in the OBD system 256 may provide access to the information corresponding to a health of the vehicle 250. Similarly, the sensors may provide the information corresponding to the Engine Control Unit (ECU). Further, the OBD system 256 may provide the information corresponding to speed, data related to Rotations per Minute (RPM), diagnostic trouble codes and malfunctioning indicators.

In one implementations, the system 102 may collect the information from the user devices 104. For example, the system 102 may collect the information from sensors (not shown) in the user devices 104. The sensors may include, but not limited to, an accelerometer, a GPS, a gyroscope, etc. In one implementation, the information may be collected using the sensors present in the vehicle 250. When the user devices 104 are used in the vehicle 250, the sensors in the vehicle 250 may communicate with the user devices 104; e.g., using a Bluetooth. In other implementations, the sensors present in the user devices 104 may collect the information. After the information is collected, the information may be transmitted to the system 102 via internet. In one example, the user devices 104 may be present in other vehicles. The user devices 104 may collect the information corresponding to driving events from the sensors present in the user devices 104 or an OBD system of the other vehicles. In other examples, the user devices 104 may receive the information from a USB dongle connected to the other vehicle. After receiving the information, the user devices 104 may send the information to the system 102 for further processing. For instance, when the user devices 104 are used in the vehicle 250, the information collected by the sensors of the user devices 104 may be sent to the system 102 for collating the information. Upon receiving the information from the user devices 104, the system 102 may aggregate the information for processing. The user devices 104 may communicate with the system 102 via a Bluetooth, Wi-Fi, etc. In one implementation, the user devices 104 may collect the information when the user devices 104 are not connected to the system 102. When the user devices 104 are not connected to the system 102, the user devices 104 may collect the information and store the information in their respective memories (not shown). At a later stage, when the user devices 104 are connected to the system 102, the user devices 104 may transmit the information to the system 102 for further processing.

As discussed, the driver assistance technologies 254 may be used to assist the driver. In one example, the driver assistance technologies 254 may include one of an adaptive cruise control, a standard cruise control, an automated braking system, a collision avoidance system, and a driver drowsiness detection system. In another example, the driver assistance technologies 254 may include one of sensors such as LIDAR, RADAR, Sonar devices, Infrared sensors, a camera, etc. The adaptive cruise control may be used to run the vehicle 250 using the one or more plurality of sensors. The automatic braking system may be used to control speed of the vehicle 250 using the information from the plurality of sensors. The collision avoidance system may use be used to divert the vehicle 250 from colliding with other objects while the vehicle 250 is running. The vehicle 250 may be diverted using the information received from the proximity sensors. The driver drowsiness detection system may be used to alert the driver by detecting eye movement/position of the driver while driving the vehicle 250. The driver drowsiness detection system may use the camera mounted in the vehicle 250 to monitor the eye movement/position of the driver.

After identifying the one or more components, the system 102 may identify capabilities of the vehicle 250. For example, the system 102 may identify manufacturer of the vehicle 250. In another example, the system 102 may identify the driver assistance technologies available in the vehicle 250. In another example, the system 102 may identify manufacturing year of the vehicle 250. After identifying the capabilities of the vehicle 250, the system 102 may retrieve the information corresponding to a health of the one or more components 254. The health may indicate a status of the one or more components 254 functionalities. In one example, the health may include the information of maintenance of the vehicle 250, e.g., the vehicle is serviced once in two months. In another example, the health may include distance traveled by the vehicle 250, e.g., 50000 kilometers. In another example the health may include the information corresponding warranty of the vehicle 250, e.g., 2 years. In one implementation, the capabilities of the vehicle 250 may be obtained from the manufacturer of the vehicle 250. Specifically, the capability of the vehicle 250 may be obtained using a specification/manual of the vehicle 250 provided by the manufacturer. In one implementation, the capabilities may be obtained from a source. In one example, the source may be a National Highway Traffic Safety Administration.

After collecting the information, the system 102 may analyse the information to create a plurality of driving scenarios. The system 102 may create the plurality of scenarios based on one or more factors. In one example, the one or more factors may comprise a location, a time, a weather, traffic density, etc. For instance, the system 102 may create a driving scenario when the vehicle 250 is travelling along a particular location. Similarly, the system 102 may create a driving scenario when the vehicle 250 is running at a particular time in a day. For each driving scenario, the system 102 may calculate a first score and a second score. The system 102 may calculate the first score corresponding to activation of each of the driver assistance technologies in the plurality of driving scenarios. In other words, the system 102 calculates the first score when the plurality of sensors detect that the driver assistance technologies 254 are activated in the vehicle 250. The system 102 may calculate the second score based on the driving behaviour in the plurality of driving scenarios.

Based on the information the system 102 may calculate the first score corresponding to each of the driver assistance technologies 252 may be calculated. In other words, the system 102 may calculate the first score for each parameter of the driver assistance technologies 252. For example, the parameters may include, but not limited to, a forward collision warning, a lane departure warning, a frontal pedestrian impact mitigation braking, a lane keeping support and an adaptive cruise control. The parameters presented in the description are for the purpose of illustration only and a person skilled in the art may consider other parameters to calculate the first score. For each parameter, primary variables and secondary variables of the driver assistance technology 254 may be considered. The primary variable may indicate a parameter that impacts safety offered by the driver assistance technology 254. The second variable may indicate a parameter that is impacting/supporting functioning of the driver assistance technology 254.

In order to illustrate calculating the first score, an example may be used. Consider the driver assistance technology 254 used to assist the driver in forward collision warning. For the forward collision warning, the primary variables and scoring bands may be presented as shown in Table 1. The scoring bands may indicate maximum and minimum of scores.

Table 1: Primary Variables and Scoring Bands

TABLE 1

| Primary variable | Minimum Score | Maximum Score |
| --- | --- | --- |
| Technology not available/ Technology not working (based on information from driver assistance technology) | 0 | 0 |
| Technology available, warranty expired, vehicle mileage out of service schedule (based on logged info ) | 10 | 40 |
| Available, but maintenance indicator active. | 40 | 60 |
| Available and functioning, no maintenance indicators | 60 | 100 |

For the above example, if the vehicle 250 is functioning and there is no maintenance required, the first score for the forward collision warning may be determined in the range of 60-100. In other words, the first score lies in between 60-100. After determining the first score for the forward collision warning, a score for the second variables may be determined. The score for the second variable may determine the actual score for the forward collision warning. For each second variable, a weight may be assigned. The weight may determine influence on safety considering the functioning of the forward collision system. In one implementation, the weight may be determined based on a likelihood of failure of the driver assistance technology 254. The likelihood of failure may be obtained using a historical data such as maintenance data sources, information from the manufacturer and third party sources etc. For example, consider the second variables such as the distance driven is less than 50,000 kilometers. The score may be calculated based on the range and the weight determined for the second variable. In order to illustrate calculating the score for the second variable, Table 2 may be used as an example. Specifically, Table 2 shows the score determined for the second variables.

Table 2: Second Variables and Score

TABLE 2

| Secondary Parameters | Score |
| --- | --- |
| distance driven < 50,000 | (Range) * 0.6 |
| Rating of manufacturer component | (Range) * 0.4 (Sub-bands) |

The distance driven may be obtained using the information received from the OBD system 256. Further, rating of manufacturer component such as the forward collision warning may be obtained from a source; e.g., a government database. For the above example, consider the rating obtained is 4. As discussed, the second variable may be assigned a weight. For the distance traveled, the weight maybe assigned as 0.6. Similarly, for the rating of the manufacturer, the weight may be assigned as 0.4. Referring to Table 1, it may be observed that the range defined for the forward collision warning is 40 i.e., (60–100). If the vehicle 250 had traveled the distance less than 50,000 kilometers, the score for the second variable may be determined as 40*0.6; i.e., 24. After calculating the score for the second variable, the first score may be increased to 60+24=84. Further, if the rating of the manufacturer for the forward collision warning is determined as 4, where a sub-band indicates a reference band that corresponds to 90%; i.e., 90% of 16 for 40% range. The first score for the forward collision warning system 254 may be calculated as 60+24+14; i.e., 98.

Similarly, the first score for each driver assistance technology 254 maybe calculated. After calculating the first score for each of the driver assistance technology 254, an overall score may be determined. In one implementation, in order to calculate the overall score, a weightage may be assigned to each of the driver assistance technology 254. The weightage may be assigned based on importance of technology in reducing a risk associated with an event, such as an accident. For example, consider the forward collision warning system is important as compared to the adaptive cruise control, then the forward collision warning system may be assigned the weightage i.e., 0.3 and the adaptive cruise control may be assigned the weightage i.e., 0.2. After assigning the weightage to each of the driver assistance technology 254, the overall score may be calculated. In one example, the overall score may be calculated as:

Overall score=0.3*Forward collision warnings score+ 0.2*Lane departure warning score+0.2*Frontal pedestrian impact mitigation braking+0.2*Lane Keeping Support+ 0.1*Adaptive cruise control.

In one implementation, the first score may be calculated by the system 102 and the user devices 104. For example, consider the system 102 is implemented in the vehicle 250 running in a location having a poor reception of signals from satellite. The user devices 104 may calculate and aggregate the first score. When the system 102 receives signals from the satellite, the user devices 104 may communicate with the system 102 to transmit the first score.

In one implementation, the system 102 may calculate the second score based on the driving behaviour of the driver. The driving behaviour may be calculated using the information collected from the OBD systems 256. Specifically, the information may be collected from the plurality of sensors. As discussed, the plurality of sensors may include, but not limited to, the accelerometer, the gyroscope, the compass, the Micro Electro Mechanical System (MEMS) sensor, and the Global Positioning System (GPS) sensor. In order to obtain the driving behaviour of the driver, the system 102 may receive one or more values corresponding to a plurality of variables. Specifically, the system 102 may receive the one or more values corresponding to the plurality of variables from the plurality of sensors, or from third party sources in real-time, or a combination thereof. The plurality of variables may be associated with driving of the vehicle 250. In one example, the plurality of variables may comprise acceleration, a braking, a cornering, over-speeding, or a time of drive, or a combination thereof. By way of a specific example, the one or more values may be in Mph/second for a variable such as the acceleration. Similarly, the one or more values for the variable, the over speeding may be in terms of a speeding duration, a speed limit, and a speed of the vehicle. The speed limit may be received from third party sources in real-time. Further, the speed limit may vary based on a route opted by the user. By way of a specific example, the third party sources may comprise a database providing the speed limit for the route opted by the user for driving the vehicle.

Based on the one or more values, the system 102 may compute one or more safety scores for the plurality of variables. In order to compute the safety scores, the system 102 may reduce a pre-defined score of a variable by a factor. In one example, the factor may be obtained based on the one or more values. Further, the one or more safety scores may be computed for a trip completed by the user. Completion of the trip may be based on one or more conditions. For instance, the one or more conditions may comprise a distance covered by the trip or a time taken for completing the trip is within a pre-determined range, a speed of the vehicle is less than a pre-determined threshold speed and a time for which the speed of the vehicle is less than the pre-determined threshold speed is greater than a pre-determined threshold time, the speed of the vehicle is below a pre-determined threshold speed, a distance covered by the trip is more than a pre-determined threshold distance, or a time taken for completing the trip is less than a pre-determined threshold time, or a combination thereof. In one implementation, the one or more safety scores may comprise an acceleration safety score corresponding to the acceleration, a braking safety score corresponding to the braking, an overspeeding safety score corresponding to the overspeeding, a cornering safety score corresponding to the cornering and a time of drive safety score corresponding to the time of drive.

Figure 3:
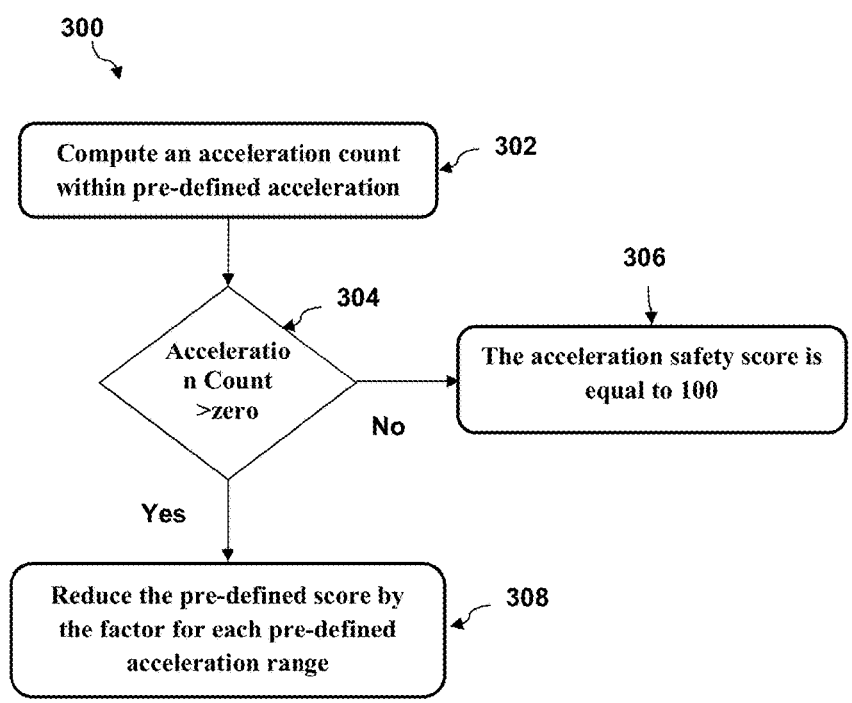
FIG. 3 illustrates a method for computing acceleration safety score, in accordance with an embodiment of the present disclosure.

In order to explain computation of the acceleration safety score, FIG. 3 may be used as an exemplary embodiment. Referring to FIG. 3, a method 300 for computing the acceleration safety score is illustrated. By way of a specific example, the pre-defined score may be considered as 100. In a first step (302), an acceleration count within pre-defined acceleration ranges may be computed. The acceleration count may be computed as soon as the one or more values are received by the plurality of sensors. For example, consider the pre-defined acceleration ranges may be 8.1-9.0 Mph/second, 9.1-10 Mph/second, 10.1-11.0 Mph/second and >11.0 Mph/second. The trip for which the value for the acceleration does not fall within the pre-defined acceleration ranges may receive the acceleration safety score of 100 (step 304 and step 306). Further (step 306 and step 308); the pre-defined score of value 100 may be reduced by the factor. The factor may be computed based on the acceleration count within the pre-defined acceleration ranges.

Table 3 and 4: Pre-Defined Acceleration and % Reduction in the Acceleration Safety Score.

TABLE 3

| Pre-defined Acceleration Ranges | % Reduction in the acceleration safety score |
|---|---|
| 8.1-9.0 Mph/second | X1 % per count |
| 9.1-10 Mph/second | X2 % per count |
| 10.1-11.0 Mph/second | X3 % per count |
| >11.0 Mph/second | X4 % per count |

TABLE 4

|  | X1 | X2 | X3 | X4 |
|---|---|---|---|---|
| 1 | X11 | X12 | X13 | X14 |
| >1 & =2 | X21 | X22 | X23 | X24 |
| >2 & <=4 | X31 | X32 | X34 | X35 |
| >4 | X41 | X42 | X43 | X44 |

Referring to the Table 3, X1, X2, X3 and X4 represents the percentage reduction in the acceleration safety score per acceleration count in the pre-defined acceleration ranges. Further, referring to the Table 4, the factor may be computed based on the acceleration count. When the acceleration count is 1, X11, X12, X13, X14 would be equal to X1, X2, X3 and X4. Similarly, when the acceleration count is greater than 1, X21 to X44 would be multiplied with X1, X2, X3 or X4. Thus, the acceleration safety score may be computed by reducing the pre-defined score of 100.

In another implementation, the acceleration safety score may be further multiplied with a plurality of factors. For instance, the plurality of factors may be computed based on weather, location, and time of the day. Optionally, the percentage reduction of the acceleration safety score may be computed for each incremental increase in the acceleration count in a corresponding level.

Figure 4:
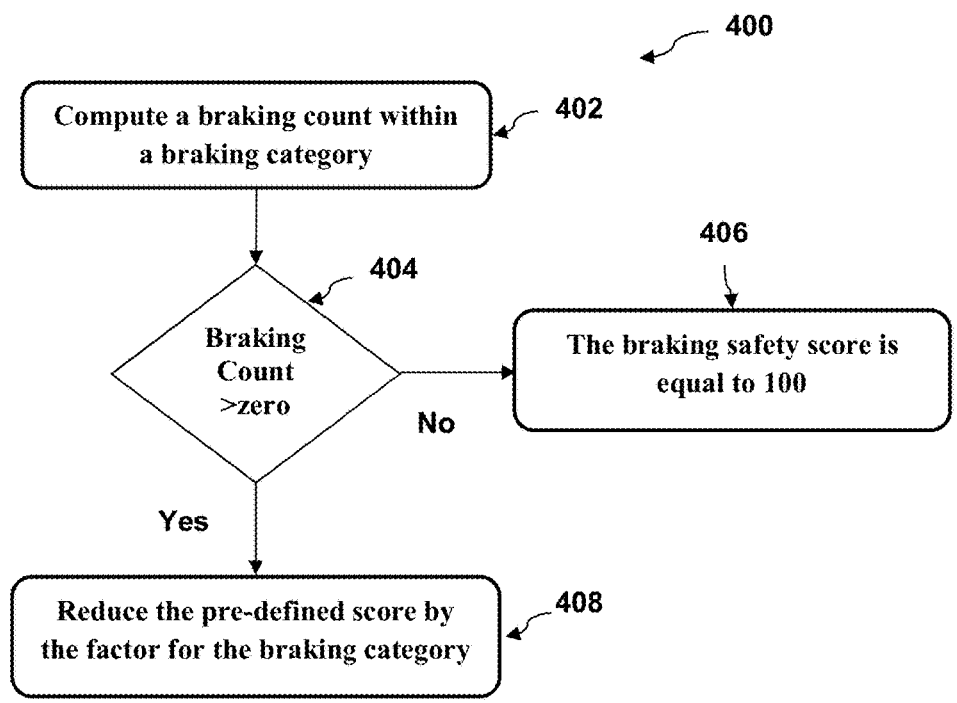
FIG. 4 illustrates a method for computing braking safety score, in accordance with an embodiment of the present disclosure.

Referring to FIG. 4, a method 400 for computing the braking safety score may be described in one exemplary embodiment. By way of a specific example, the pre-defined score may be 100. In a first step (402), a braking count may be computed for a number of brakes within a braking category. The braking category may be defined using pre-defined deceleration ranges. For example, the pre-defined deceleration ranges may be, −8.1-−9.0 Mph/second, −9.1-−10.0 Mph/second, −10.1-−11 Mph/second and <−11.0 Mph/second. The trip for which the braking count is zero within the braking category may receive the braking safety score of 100 (step 404 and step 406). Further (step 406 and step 408), when the breaking count is not zero, the pre-defined score of value 100 may be reduced by the factor. The factor may be computed based on the braking count within the braking category.

Table 5 and Table 6: Computation of Braking Safety Score

TABLE 5

| Braking Category | % Reduction in the braking safety score |
|---|---|
| −8.1−−9.0 Mph/second | Y1 |
| −9.1−−10.0 Mph/second | Y2 |
| −10.1−−11 Mph/second | Y3 |
| <−11 Mph/second | Y4 |

TABLE 6

|  | Y1 | Y2 | Y3 | Y4 |
|---|---|---|---|---|
| 1 | Y11 | Y12 | Y13 | Y14 |
| >1 & =2. | Y21 | Y22 | Y23 | Y24 |
| >2 & <=4 | Y31 | Y32 | Y33 | Y34 |
| >4 & <=6 | Y41 | Y42 | Y43 | Y44 |
| >6 | Y51 | Y52 | Y53 | Y54 |

Referring to Table 5, the factor for reducing the pre-defined score of 100 may be Y1, Y2, Y3, and Y4 based on the braking count within the pre-defined deceleration ranges. Further, referring to Table 6, the factor may be multiplied by 1 when the braking count is 1. Y1, Y2, Y3, Y4 is equal to Y11, Y12, Y13, and Y14 as the braking count is equal to 1. Y21 to Y54 represents the factor for the braking count greater than 1, which will be multiplied with the corresponding Y1 to Y4, based on the braking count for the trip. Thus, the braking safety score may be computed by reducing the pre-defined score of 100.

In another implementation, the braking safety score may be further multiplied with a plurality of factors. For instance, the plurality of factors may be computed based on weather, location, time of the day, or a combination thereof. Optionally, the percentage reduction of the braking safety score may be computed for each incremental increase in the braking count in a corresponding level.

Further, the over speeding safety score may be computed based on a speeding duration and a speeding count. In order to compute the over speeding safety score, the speed limit of the route and the speed of the vehicle may be compared. By way of a specific example, the pre-defined score may be 100. The overspeeding safety score may be reduced based on the speeding duration and the speed of the vehicle above the speed limit. The factor for reducing the pre-defined score of 100 may be computed based on a percentage by which the speed of the vehicle exceeds the speed limit. The speed limit may be a maximum speed limit set for the route.

Table 7 and Table 8: Computation of Overspeeding Safety Score

TABLE 7

| Vehicle Speed | Reduction Factor (S1 < S2 < S3 < S4) |
|---|---|
| <=S | 1 |
| >S & <= S + 10 | S1 |
| >S + 10 & <= S + 20 | S2 |
| >S + 20 & <= S + 50 | S3 |
| >S + 50 | S4 |

TABLE 8

|  | <10% | >10% & <= 30% | >30 & % <= 50% | >50% |
|---|---|---|---|---|
| >S & <= S + 10 | S11 | S12 | S13 | S14 |
| >S +10 & <= S + 20 | S21 | S22 | S23 | S23 |
| >S + 20 & <= S + 50 | S31 | S32 | S33 | S34 |
| >S + 50 | S41 | S42 | S43 | S44 |

Referring to the Table 7, S+10 refers to the speed of the vehicle above the speed limit by 10 mph. Similarly, S+20 and S+50 refers to the speed of the vehicle above the speed limit by 20 mph and 50 mph. S1, S2, S3 and S4 are the factors by which the pre-defined score may be reduced. Referring to the Table 8, the factors S1, S2, S3 and S4 may be respectively multiplied with the factor corresponding to the percentage of miles in the trip which were driven above the speed limit. The factors S11 to S44 are the factors greater than 1. The factors S11 to S44 may be multiplied with the corresponding factors S1 to S4 to compute the overspeeding safety score.

In another implementation, the over speeding safety score may be further multiplied with a plurality of factors. For instance, the plurality of factors may be computed based on weather, location, and time of the day. Optionally, the percentage reduction of the overspeeding safety score may be computed for each incremental increase in an overspeeding count in a corresponding level.

Further, the cornering safety score may be computed based on a number of cornering events and a cornering level. By way of a specific example, the pre-defined score may be 100. The pre-defined score of 100 may be reduced based on the number of the cornering events. When only the cornering events are recorded, irrespective of the cornering level, the cornering safety score may be reduced by the factor for every cornering event. Further, by way of a specific example, the cornering level may be level 1, level 2, level 3 or level 4. Each of the cornering level may be associated with a percentage reduction value. The percentage reduction value may be the factor used for computing the cornering safety score.

Table 9 and Table 10: Computation of Cornering Safety Score

TABLE 9

| Cornering Level | Reduction % (C1 < C2 < C3 < C4) |
|---|---|
| Level 1 | C1 |
| Level 2 | C2 |
| Level 3 | C3 |
| Level 4 | C4 |

TABLE 10

|  | C1 | C2 | C3 | C4 |
|---|---|---|---|---|
| 1 | C11 | C12 | C13 | C13 |
| >1 & <= 3 | C21 | C22 | C23 | C24 |
| >3 & < 5 | C31 | C32 | C33 | C34 |
| >5 | C41 | C42 | C43 | C44 |

Referring to Table 9, the percentage reduction value C1, C2, C3 and C4 for a single cornering event in level 1 to level 4 is disclosed. Referring to Table 10, percentage reduction value may be multiplied by a number greater than 1 for multiple cornering events. C11, C12, C13 and C14 are equal to C11, C12, C13 and C14 as the cornering event is one. C21 to C44 represents cornering events greater than 1, which may be multiplied with the reduction percentage values C1 to C4 respectively to reduce the pre-defined cornering score. Thus, a resulting value is the cornering safety score.

In another implementation, the cornering safety score may be further multiplied with a plurality of factors. For instance, the plurality of factors may be computed based on weather, location, and time of the day. Optionally, the percentage reduction of the cornering safety score may be computed for each incremental increase in the cornering event in a corresponding level.

Subsequently, the system 102 may aggregate the one or more safety scores to calculate the second score for the driving behaviour. In one implementation, the system 102 may compute an average of the one or more safety scores to calculate the second score. In another implementation, the system 102 may compute a weighted average of the one or more safety scores to calculate the second score. In one example, the second score may be calculated on a scale of 100. In one implementation, the user devices 104 may calculate the second score and transmit the second score to the system 102.

In one implementation, the system 102 may calculate smoothness of the driving for a driving instance. For example, the smoothness may be calculated based on a braking score, an acceleration score, a cornering score and a jerk score. The braking score may be calculated using a braking count, a braking magnitude band and causal variables. The braking count may comprise a primary braking variable that determines a range; i.e., maximum and minimum value. The causal variables may be identified using a statistical model.

At first, the range i.e., maximum and the minimum score for the braking count may be calculated. In order to explain calculating the braking score, Table 11 may be used as an example. Specifically, Table 11 shows score range of the braking count based on a percentile distribution of the braking count in a sample population.

Table 11: Braking Count in a Sample Population

TABLE 11

| Braking Count | Cumulative % | Rounded Cum % | Min Score = 100% − Rounded Cum % |
|---|---|---|---|
| 0 | 42 | 40 | 60 |
| 1 | 60 | 60 | 40 |
| 2 | 73 | 75 | 25 |
| 3 | 81 | 80 | 20 |
| 4 | 86 | 85 | 15 |
| 5 | 90 | 90 | 10 |
| 6 | 93 | 93 | 7 |
| 7 | 95 | 95 | 5 |
| 8 | 96 | 96 | 4 |
| 9 | 97 | 97 | 3 |
| 10 | 98 | 98 | 2 |
| 11 | 98 | 98 | 2 |
| 12 | 99 | 99 | 1 |
| 13 | 99 | 99 | 1 |
| 14 | 99 | 99 | 1 |
| 15 | 99 | 99 | 1 |
| 16 | 99 | 99 | 1 |
| >16 | 100 | 100 | 0 |

Using the sample distribution, the braking count for the trip to arrive at the range of score may be calculated. The score ranges selected using the sample distribution may be illustrated in Table 12.

Table 12: Score Ranges Selected Based on Braking Count

TABLE 12

| Count | Min Score | Max Score | Range (= Max − Min) |
|---|---|---|---|
| 0 | 60 | 100 | 40 |
| 1 | 40 | 60 | 20 |
| 2 | 25 | 40 | 15 |
| 3 | 20 | 25 | 5 |
| 4 | 15 | 20 | 5 |
| 5 | 10 | 15 | 5 |
| >5 | 0 | 10 | 10 |

After obtaining the scores for the braking count, the score range may be narrowed down to calculate score A based on the braking magnitude band. For the braking count, if the count is non-zero for only one braking band, then the braking count band is the band where the count is non-zero. Further, if the count is non-zero for more than one band, then the braking count band is calculated as:

$$\text{Braking Count Band} = \text{Round-Off}(((C1/C)*1) + ((C2/C)*2) + ((C3/C)*3) + ((C4/C)*4) + ((C5/C)*5))$$

Where C=Total Braking Count, C1=Braking Count for Band 1, C2=Braking Count for Band 2 and so on. Table 13 shows the score A calculated based on the braking magnitude band.

Table 13: Score A Based on Braking Magnitude Band

TABLE 13

| Braking Magnitude Band | Score A |
|---|---|
| 1 | Max Score − ((Range/5)*1) OR Min Score + ((Range/5)*4) |
| 2 | Max Score − ((Range/5)*2) OR Min Score + ((Range/5)*3) |
| 3 | Max Score − ((Range/5)*3) ) OR Min Score + ((Range/5)*2) |
| 4 | Max Score − ((Range/5)*4) ) OR Min Score + ((Range/5)*1) |
| 5 | Max Score − ((Range/5)*5) OR Min Score |

Subsequently, a model score and score B may be calculated based on causal variables. The score B may be calculated as Model Score*(Range/5). The model score may be calculated as exp C/(1+exp C). The c is (1.3153)+((−0.5775)*Acceleration Count)+((−0.0245)*Average Speed)+((−0.000379)*Net Duration)+((−0.00126)*Idle-Time). After calculating the score A and score B, the braking score may be calculated. In one example, the braking score for a driving instance may be calculated as driving scenario/Trip Braking Score=Score A+Score B. The braking score calculated may be present in the range of the score range as shown in Table 12.

Similarly, the cornering score may be calculated. The cornering score may be using a cornering count, a cornering magnitude band and causal variables. The causal variables may be identified using a statistical model. Firstly, maximum and minimum score of the cornering count may be calculated. In order to explain calculating the cornering score Table 14 may be used as an example. Table 14 shows score range of the cornering count based on percentile distribution of the cornering count in a sample distribution.

Table 14: Cornering Count in a Sample Distribution

TABLE 14

| Cornering Count | Cumulative % | Rounded Cum % | Min Score = 100% − Rounded Cum % |
|---|---|---|---|
| 0 | 58 | 60 | 40 |
| 1 | 79 | 80 | 20 |
| 2 | 89 | 90 | 10 |
| 3 | 94 | 95 | 5 |
| 4 | 97 | 97 | 3 |
| 5 | 98 | 98 | 2 |
| 6 | 99 | 99 | 1 |
| >6 | 100 | 100 | 0 |

Using the sample distribution, the cornering count for the driving instance to arrive at a range of score may be calculated. The score ranges selected using the sample distribution may be illustrated in Table 15.

Table 15: Score Ranges Selected Based on Cornering Count

TABLE 15

| Count | Min Score | Max Score | Range (= Max − Min) |
|---|---|---|---|
| 0 | 40 | 100 | 60 |
| 1 | 20 | 40 | 20 |
| 2 | 10 | 20 | 10 |
| 3 | 5 | 10 | 5 |
| 4 | 3 | 5 | 2 |
| 5 | 2 | 3 | 1 |
| >5 | 0 | 2 | 1 |

After obtaining the scores for the cornering count, the score range may be narrowed down to calculate score A based on cornering magnitude band. For the cornering count, if count is non-zero for only one band, then cornering count band is the band where the count is non-zero. Further, if count is non-zero for more than one band, then, the cornering count band is calculated as:

Cornering count band=Round-Off(((C1/C)*1)+((C2/C)*2)+((C3/C)*3)+((C4/C)*4)+((C5/C)*5)).

The C=Total Cornering Count, C1=Cornering Count for Band 1, C2=Cornering Count for Band 2 and so on. Table 16 shows the score A calculated based on the cornering magnitude band.

Table 16: Score A Based on the Cornering Magnitude Band

TABLE 16

| Cornering Magnitude Band | Score A |
|---|---|
| 1 | Max Score − ((Range/5)*1) OR Min Score + ((Range/5)*4) |
| 2 | Max Score − ((Range/5)*2) OR Min Score + ((Range/5)*3) |
| 3 | Max Score − ((Range/5)*3) ) OR Min Score + ((Range/5)*2) |
| 4 | Max Score − ((Range/5)*4) ) OR Min Score + ((Range/5)*1) |
| 5 | Max Score − ((Range/5)*5) OR Min Score |

Subsequently, a model score and score B may be calculated based on causal variables. The score B may be calculated as Model Score*(Range/5). The model score may be calculated as exp C/(1+exp C). The Cis (2.9451)+((−0.0249)*Max Speed)+((−0.3358)*Acceleration Count)+((−0.000967)*IdleTime)

After calculating score A and score B, the cornering score may be calculated. In one example, the cornering score for a driving instance may be calculated as Trip cornering Score=Score A+Score B. The cornering score calculated may be present in the range of the score range as shown in Table 15.

Similarly, the acceleration score may be calculated. The acceleration score may be using an acceleration count, an acceleration magnitude band and causal variables. The causal variables may be identified using a statistical model. Firstly, maximum and minimum score of the acceleration count may be calculated. In order to explain calculating the acceleration score, Table 17 may be used as an example. Table 14 shows score range of the acceleration count based on percentile distribution of the acceleration count in a sample distribution.

Table 17: Acceleration Count in a Sample Distribution

TABLE 17

| Acceleration Count | Cumulative % | Rounded Cum % | Min Score = 100% − Rounded Cum % |
|---|---|---|---|
| 0 | 71 | 70 | 30 |
| 1 | 90 | 90 | 10 |
| 2 | 96 | 96 | 4 |
| 3 | 98 | 98 | 2 |
| 4 | 99 | 99 | 1 |
| 5 | 99 | 99 | 1 |
| >5 | 100 | 100 | 0 |

Using the sample distribution, the acceleration count for the driving instance to arrive at a range of score may be calculated. The score ranges selected using the sample distribution may be illustrated in Table 18.

Table 18: Score Ranges Selected Based on Acceleration Count

TABLE 18

| Count | Min Score | Max Score | Range (= Max − Min) |
|---|---|---|---|
| 0 | 30 | 100 | 70 |
| 1 | 10 | 30 | 20 |
| 2 | 4 | 10 | 6 |
| 3 | 2 | 4 | 2 |
| 4 | 1 | 2 | 1 |
| 5 | 1 | 1 | 0 |
| >5 | 0 | 0 | 0 |

After obtaining the scores for the acceleration count, the score range may be narrowed down to calculate score A based on acceleration magnitude band. For the cornering count, if count is non-zero for only one band, then acceleration count band is the band where the count is non-zero. Further, if count is non-zero for more than one band, then, the acceleration count band is calculated as:

Acceleration count band=Round-Off(((C1/C)*1)+((C2/C)*2)+((C3/C)*3)+((C4/C)*4)+((C5/C)*5)).

The C=Total Cornering Count, C1=acceleration Count for Band 1, C2=acceleration Count for Band 2 and so on. Table 19 shows the score A calculated based on the acceleration magnitude band.

Table 19: Score A Based on the Acceleration Magnitude Band

TABLE 19

| Acceleration Magnitude Band | Score A |
| --- | --- |
| 1 | Max Score − ((Range/5)*1) OR Min Score + ((Range/5)*4) |
| 2 | Max Score − ((Range/5)*2) OR Min Score + ((Range/5)*3) |
| 3 | Max Score − ((Range/5)*3) ) OR Min Score + ((Range/5)*2) |
| 4 | Max Score − ((Range/5)*4) ) OR Min Score + ((Range/5)*1) |
| 5 | Max Score − ((Range/5)*5) OR Min Score |

After calculating score A and score B, the cornering score may be calculated. In one example, the acceleration score for a driving instance may be calculated as Trip cornering Score=Score A+Score B. The acceleration score calculated may be present in the range of the score range as shown in Table 18.

In one implantation, the system 102 may calculate the jerk score. The jerk score may be measured in terms of g-forces from the accelerometer attached to the vehicle 250. In one example, the jerk score may be measure from the acceleration received from the plurality of sensors. After receiving the acceleration, a high pass filter may be used to remove the noise. In one example, the jerk score may be obtained in the range shown in Table 20.

Table 20: Score Range Based on g-Force

TABLE 20

| g-force | Min Score | Max Score | Range (= Max − Min) |
| --- | --- | --- | --- |
| <0.3 g | 80 | 100 | 40 |
| 0.3 g to 0.4 g | 60 | 80 | 20 |
| 0.4 g to 0.5 g | 40 | 60 | 15 |
| >0.5 g | 0 | 40 | 5 |

The jerk score may be obtained in the range i.e., max speed/(1+max speed).

After calculating the braking core, the cornering score, the acceleration score and the jerk score, an overall score for the driving instance may be calculated. For example, a weight may be assigned to each of the braking core, the cornering score, the acceleration score and the jerk score. The weight may be assigned based on a relative importance of the parameters. In one example, the braking score may be assigned with a weight of 0.4. In another example, the jerk score may be assigned with a weight of 0.10. Similarly, the weights may be assigned to each of the parameters. After assigning the weight, a weighted average may be calculated. For example, the overall score for a driving instance may be calculated as:

$$\text{Overall score} = a*(\text{Braking Score}) + b*(\text{jerk score}) + c*(\text{Acceleration Score}) + d*(\text{Cornering Score}),$$

where a, b, c, d indicate weights assigned.

After calculating the first score and the second score, the system 102 may classify a plurality of driving scenarios based the one or more factors. The system 102 may check the status of driver assistance technology 254 along with additional parameters like duration, location, health of module etc during a driving scenario. After checking the status, if the driver assistance technology 254 is active in the driving scenario, the system 102 may combine the first score of the driver assistance technology 254 with the second score indicating the driver behaviour to classify the driving scenario. In one implementation, the system 102 may classify the driving scenario as a technology priority mode and a driver priority mode. The technology priority mode indicates activating the driver assistance technology to assist the driver in the driving scenario. The driver priority mode indicates the driver driving the vehicle without taking the assistance from the driver assistance technology. For instance in low traffic situation on highway, if the safety score i.e., second score is high when leveraging adaptive cruise control, the system 102 may classify the driving scenario as the technology priority mode. Similarly, if the driver behaviour i.e., second score is high and the first score corresponding use of driver assistance technology 254 is low, then the driving scenario may be classified as the driver priority mode.

The information collected from the one or more components 252 may be aggregated and the driving scenario may be classified accordingly. In one example, the driving scenario may be classified based on the time of journey for the driver. In another example, the driving scenario may be classified based on the information received from a plurality of drivers travelling along a particular route. For example, the system 102 may analyse the information for the driving scenario, and the first score and the second score for the driving scenario. Based on the analysis, if the system 102 determines that the smoothness of drive is high when the driver assistance technology 254 is active, then the system 102 may classify the driving scenario as the technology priority mode.

In one example, the system 102 may provide recommendations based on impact of the smoothness of the drive in a given driving scenario. In order to provide recommendations, the system 102 may analyze the second score corresponding to driving behaviour and first score of the driver assistance technology 254 when activated. The system 102 may process the recommendations based on multiple occurrences of the same driving scenario and activation of a driver assistance technology 254. The system 102 may process the recommendations based on the information corresponding to use of driver assistance technologies 254, interactions of the driver with the vehicle 250 and effectiveness of the drive when utilizing the driver assistance technologies 254. The system 102 may provide the recommendations to the driver based on the interactions from the history. The recommendations may be processed based on the effective assistance provided by the driver assistance technologies 254 to the driver in the plurality of driving scenarios. Similarly, the system 102 may provide the recommendations to a group of users based on the information collected from the user devices 104. The technology priority mode and the driver priority mode determine how to recommend the driver to run the vehicle 250. The system 102 may check how each driver assistance technology 254 is performing when activated in a driving scenario and the duration of the activation of the driver assistance technology 254. In one implementation, the system 102 may recommend the driver to switch between the technology priority mode and the driver priority mode. For example, if the vehicle 250 is self-driven, the driver may switch between a manual mode and an automatic mode. Consider the vehicle 250 is running in a city and the system 102 recommends the driver to run the vehicle 250. If the driver switches to the manual mode to run the vehicle 250, the liability/accountability may be associated with the driver. In order to illustrate providing the recommendations, Table 21 may be used as an example. Specifically, Table 21 shows scores of driver assistance technology 254, the second score corresponding to driving behaviour and driving smoothness.

Table 21: Scores

TABLE 21

| Driving scenario | Assistive feature | Assistive feature score | Driver behaviour score | Driving smoothness score (result) |
|---|---|---|---|---|
| Highway. Low traffic. Clear weather | Cruise control | 98 | 80 | 90 |
| Highway. Low traffic. Clear weather | Cruise control | 98 | 84 | 92 |
| Highway. Low traffic. Clear weather | Cruise control | 98 | 90 | 96 |

The system 102 may provide recommendations based on how a particular driver assistance technology 254 may be suitable for the driver in a given driving scenario. For the above example, the system 102 may recommend that the cruise control with the first score in higher band (>90) for highway, low traffic, clear weather scenarios, if the driving smoothness score always exhibits a higher value than the driving behaviour score and smoothness score and if smoothness score improves positively based on any improvement to driver behaviour score.

As discussed above, the system 102 may consider capability of the driver assistance technology 254 and the capability of the driver for processing recommendations. Further, the system 102 may process the recommendations based on the information aggregated using historical data. After aggregating the historical data, the system 102 may provide generic recommendations. For instance, consider a driver with driver behaviour scores in a particular range with the vehicles 250 of certain category is driving the vehicle 250. If the second (safety) scores are high, and the vehicle 250 is using the driver assistance technology 254, the system 102 may recommend the driver to run the vehicle 250. In one implementation, the system 102 may process driver specific recommendations based on the safety scores from the historical data. When the driver specific recommendations are provided, the generic recommendations, if available, may be superseded by the driver specific recommendations. Further, the driver specific recommendations may be used to enhance the generic recommendations.

In one example, the system 102 may consider the driver assistance technology 254 and the status of the driver assistance technology to provide recommendations. For instance, if the system 102 detects the driving scenario as low traffic and highway; the system 102 may recommend engaging cruise control. The system 102 may recommend engaging the cruise control, if the cruise control health score is above a particular score. In one implementation, the driver may have to manually accept the recommendations provided by the system 102. In one implementation, the system 102 may implement the recommendations without any intervention from the driver. In one example, the system 102 may track an impact upon accepting the recommendations. After tracking the impact, the system 102 may store a result of the implementation corresponding to the recommendation in the memory 206.

Figure 5:
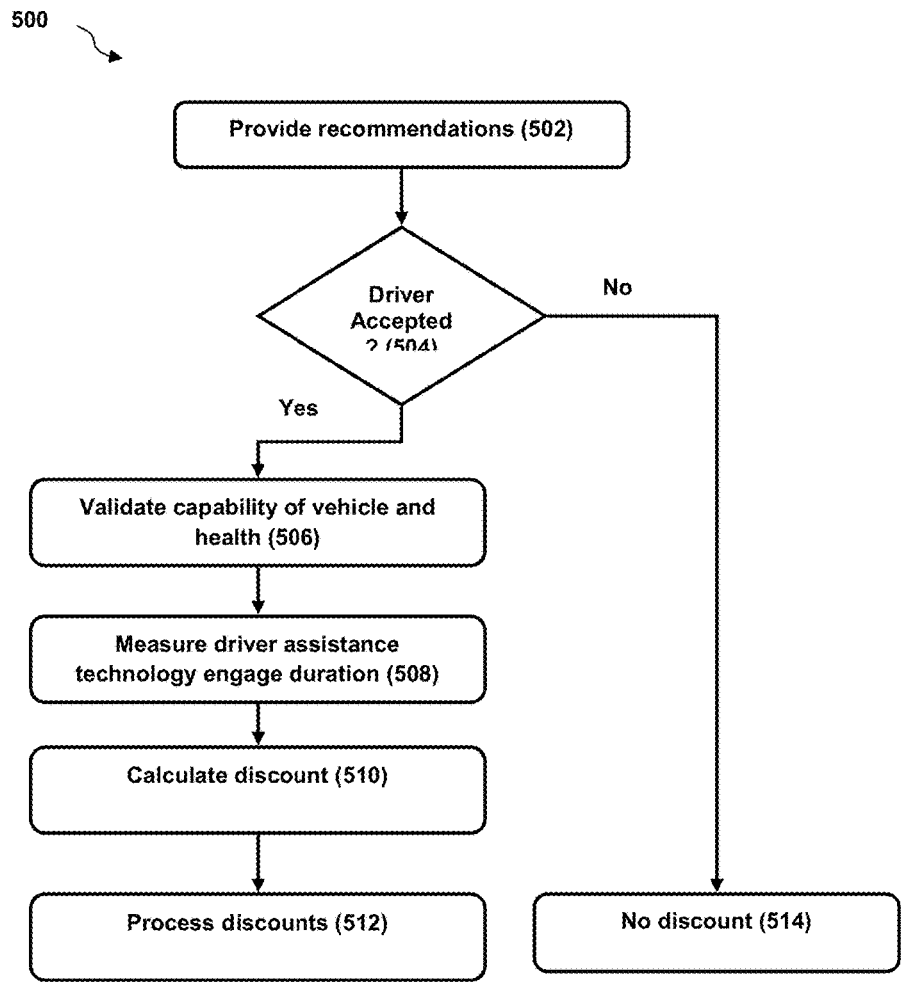
FIG. 5 illustrates a method providing the discount, in accordance with an embodiment of the present disclosure.

In one implementation, the system 102 may calculate insurance for the driver. In one implementation, the system 102 may provide a discount to the user while calculating the insurance. In order to explain providing the discount to the driver, FIG. 5 may be used. Referring to FIG. 5, a method 500 for providing the discount is disclosed. At first step/block 502, the system 102 may provide the recommendations. After the recommendations are provided, the system 102 may check whether the driver accepted at step 504. At step/block 506, if the driver accepts the recommendations, the system 102 may validate the capabilities of the driver assistance technology 254 and the health/status of the driver assistance technologies 254. Subsequently, at step/block 508, duration of the driver assistance technologies 254 may be checked. At step/block 510, the system 102 may calculate a discount/a reward for the driver. After calculating the discount/reward, at step/block 512, the system 102 may process the recommendations to the driver. In one example, the system 102 may provide 5% discount to the driver if the driver assistance technology 254 is used for longer duration. Similarly, the system 102 may provide the reward; e.g., points to the driver. At step 504, if the user does not accept the recommendations provided by the system 102, the driver may not be provided with any discounts.

In another implementation, the system 102 may provide the discounts even when the recommendations are not provided by the system 102. The system 102 may provide the discounts if the user engages the driver assistance technologies 254.

Figure 6:
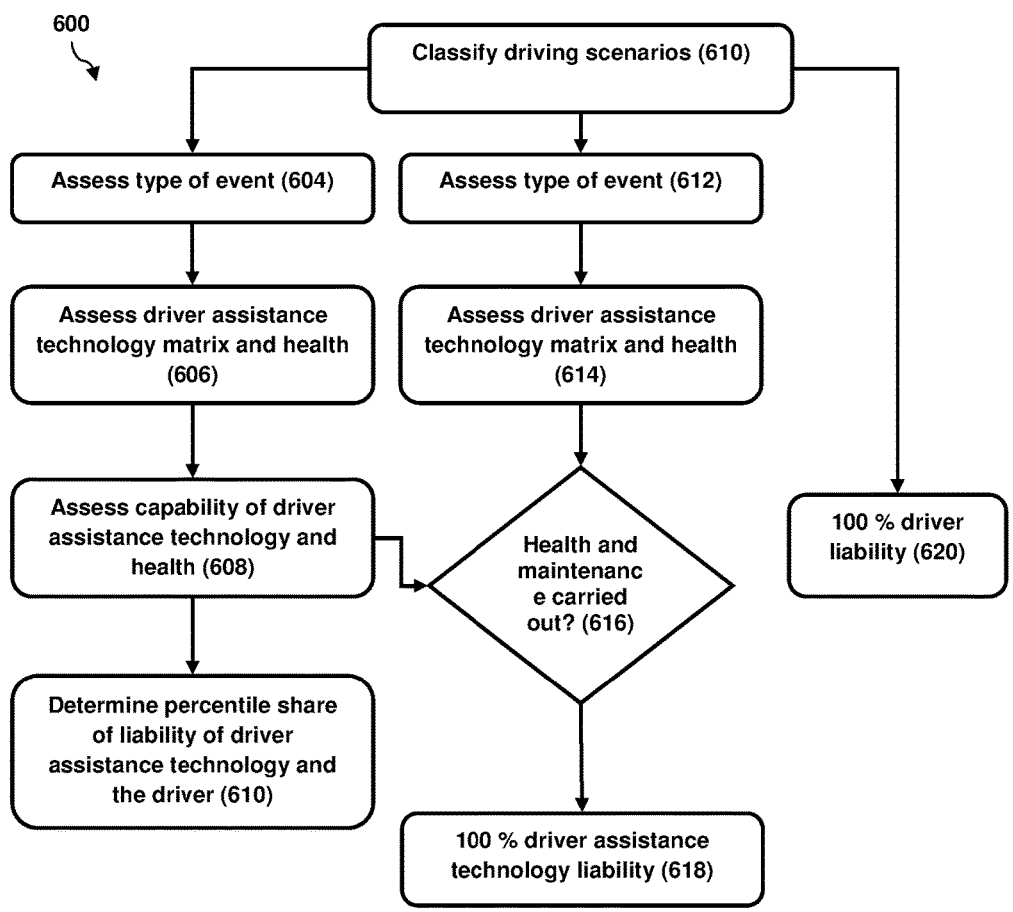
FIG. 6 illustrates a method for assessing the liability, in accordance with an embodiment of the present disclosure.

In one implementation, the system 102 may assess a liability/accountability of the driver, in an event, based on the classification of the driving scenarios. In order to explain the assessing the liability of the driver, FIG. 6 may be used. Referring to FIG. 6, a method 600 for assessing the liability is shown. At first step/block 602, the driving scenarios may be classified. In one example, the driving scenario may be classified as the technology priority mode. In another example, the driving scenario may be classified the driver priority mode. After classifying the driving scenarios, at step/block 604, the system 102 may assess type of the event. In one example, the event may include an accident. After assessing the type of the event, at step/block 606, the system 102 may assess the driver assistance technology matrix and health of the driver assistance technology. The system 102 may maintain the liability matrix based on the capabilities of the driver assistance technologies 254. For example, the liability matrix may include damage due to collision for the collision avoidance system. Further, at step/block 608, the system 102 may assess capability of the driver assistance technology and the health. After assessing the capability and the health, at step/block 610, the system 102 may determine percentile share of the liability of the driver assistance technology and the driver.

Figure 7:
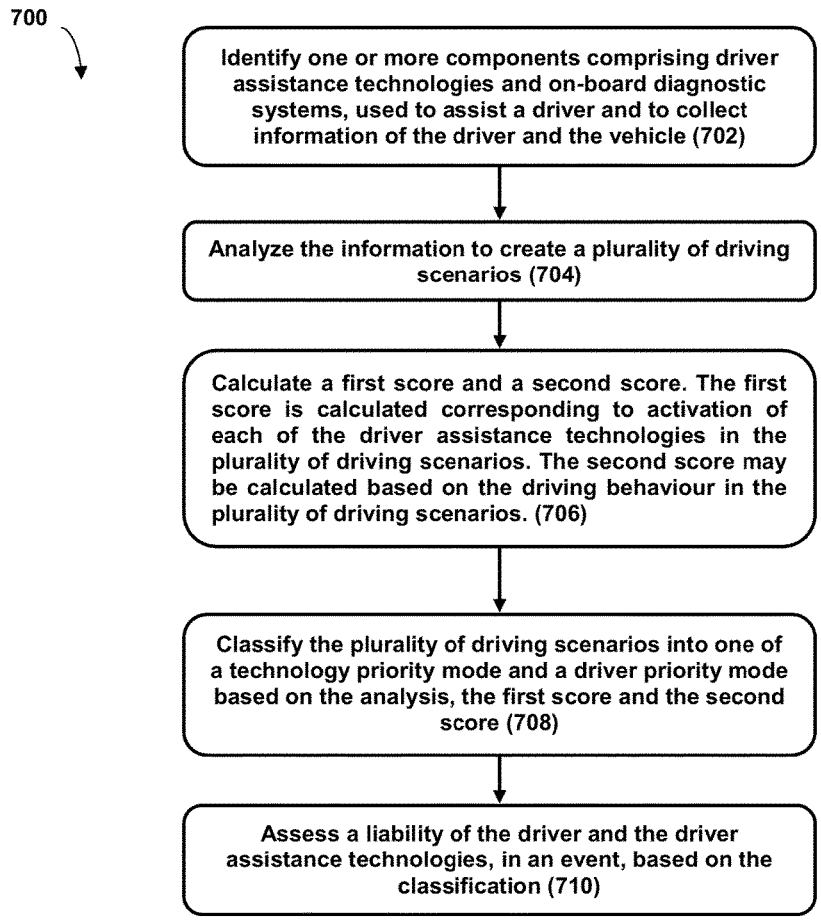
FIG. 7 shows a flowchart of a method for assessing liability of a driver or a driver assistance technology in a vehicle, in accordance with an embodiment of the present disclosure.

At step/block 610, the system 102 may assess type of the event. In one example, the event may include an accident. After assessing the type of the event, at step/block 612, the system 102 may assess the driver assistance technology matrix and health of the driver assistance technology. Further, at step 614, the system 102 may check the health and maintenance carried out for the driver assistance technology 254. If the health and the maintenance are carried out properly, at step/block 616, the system 102 may determine the liability as 100% for the driver assistance technology 254. If the driver assistance technology is not used, then the system 102 may determine the liability as 100% driver, Referring now to FIG. 7, a method 700 for assessing liability/accountability of a driver or a driver assistance technology in a vehicle is shown, in accordance with an embodiment of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the disclosure described herein. Furthermore, the method can be implemented in any suitable hardware, software, firmware, or combination thereof. However, for ease of explanation, in the embodiments described below, the method 700 may be considered to be implemented in the above described system 102.

At step/block 702, one or more components used to assist a driver and to collect information of the driver and the vehicle may be identified. The one or more components may comprise driver assistance technologies and on-board diagnostic systems. The driver assistance technologies may assist the driver. The on-board diagnostic systems may collect the information corresponding to a driving behaviour of the driver.

At step/block 704, the information may be analysed to create a plurality of driving scenarios based on one or more factors. In one example, the one or more factors may comprise a location, a time, weather, traffic, etc.

At step/block 706, a first score and a second score may be calculated. The first score may be calculated corresponding to activation of each of the driver assistance technologies in the plurality of driving scenarios. The second score may be calculated based on the driving behaviour in the plurality of driving scenarios.

At step/block 708, the plurality of driving scenarios may be classified into one of a technology priority mode and a driver priority mode based on the analysis, the first score and the second score.

At step/block 710, a liability/accountability of the driver or the driver assistance technologies may be assessed, in an event, based on the classification.

Although implementations for methods and systems for assessing liability of a driver and the driver assistance technology in a vehicle have been described in language specific to structural features and/or methods, it is to be understood that the appended claims are not necessarily limited to the specific features or methods described. Rather, the specific features and methods are disclosed as examples of implementations for assessing liability of a driver.

I claim:

1. A computer implemented method for assessing a plurality of driving scenarios, the method comprising:
    identifying, by a processor, one or more components used to assist a driver and to collect information of the driver and the vehicle, wherein the one or more components comprise a driver assistance technology and one or more on-board diagnostic systems, wherein the driver assistance technology assists the driver, and wherein the one or more on-board diagnostic systems collect information from a plurality of sensors corresponding to a driving behavior of the driver;
    identifying, by the processor, one or more capabilities of the vehicle;
    identifying, by the processor, a manufacturing year and a manufacturer of the vehicle;
    retrieving, by the processor, information corresponding to a health of the one or identified more components;
    analyzing, by the processor, information to create the plurality of driving scenarios, wherein the plurality of scenarios are created based on one or more factors, and wherein the one or more factors comprise a location, a time, and a weather condition;
    calculating, by the processor, a first score and a second score for each of the plurality of driving scenarios, wherein the first score is calculated corresponding to activation of the driver assistance technology in the plurality of driving scenarios, and wherein the second score is calculated based on the driving behavior in the plurality of driving scenarios;
    collecting, by the processor, information using the one or more on-board diagnostic systems corresponding to a speed of the vehicle driven by the driver to detect at least one of braking, cornering, acceleration, and jerk, wherein the one or more on-board diagnostic systems comprise at least one of an accelerometer, a gyroscope, an inertial navigation system (INS), a micro-electro mechanical system (MEMS), and a global positioning system;
    assisting, by the processor, the driver by activating the driver assistance technology among at least one of an adaptive cruise control, a standard cruise control, an automated braking system, a collision avoidance system, and a driver drowsiness detection system to switch between manual mode and an automatic mode, wherein the adaptive cruise control runs the vehicle using one or more of a plurality of sensors in the automatic mode, the automatic braking system controls the speed of the vehicle using information from the plurality of sensors, and the collision avoidance system diverts the vehicle from colliding with objects;
    classifying, by the processor, the plurality of driving scenarios into one of a technology priority mode and a driver priority mode based on the analysis, the first score and the second score, wherein the technology priority mode indicates use of the driver assistance technology for running the vehicle in a driving scenario of the plurality of driving scenarios, and wherein the driver priority mode indicates the vehicle driven by the driver in the driving scenario of the plurality of driving scenarios without the usage of the driver assistance technology;
    alerting the driver, by the processor, based on detection of at least one of eye movement and a position of the driver to detect drowsiness by the driver drowsiness detection system; and
    providing recommendations, by the processor, based on the driver assistance technology and at least one of the plurality of driving scenarios, wherein the recommendations are provided based on aggregation of historical data, the historical data related to maintenance data sources and information from the manufacturer of the vehicle.

2. The method of claim 1, further comprising checking acceptance of the recommendations processed.

3. The method of claim 2, further comprising calculating insurance for the driver based on the assessment and the recommendations provided.

4. The method of claim 3, further comprising providing a discount or a reward to the driver based on the acceptance of the recommendations.

5. The method of claim 1, further comprising checking a status of the one or more components.

6. A computer implemented system for assessing a plurality of driving scenarios, the system comprising:
   a memory; and
   a processor coupled to the memory, wherein the processor is capable of executing program instructions stored in the memory, to:
      identify one or more components used to assist a driver and to collect information of the driver and the vehicle, wherein the one or more components comprise a driver assistance technology and one or more on-board diagnostic systems, wherein the driver assistance technology assists the driver, and wherein the one or more on-board diagnostic systems collect information corresponding to a driving behaviour of the driver;
      identify the one or more capabilities of the vehicle;
      identify a manufacturing year and a manufacturer of the vehicle;
      retrieve information corresponding to a health of the one or more identified components;
      analyze information to create a plurality of driving scenarios, wherein the plurality of scenarios are created based on one or more factors, and wherein the one or more factors comprise a location, a time, and a weather condition;
      calculate a first score and a second score for each of the plurality of driving scenarios, wherein the first score is calculated corresponding to activation of the driver assistance technology in the plurality of driving scenarios, and wherein the second score is based on the driving behaviour in the plurality of driving scenarios;
      collect, by the processor, information using the one or more on-board diagnostic systems corresponding to a speed of the vehicle driven by the driver to detect at least one of braking, cornering, acceleration, and jerk, wherein the one or more on-board diagnostic systems comprise at least one of an accelerometer, a gyroscope, an inertial navigation system (INS), a micro-electro mechanical system (MEMS), and a global positioning system;
      assist, by the processor, the driver by activating the driver assistance technology from among at least one of an adaptive cruise control, a standard cruise control, an automated braking system, a collision avoidance system, and a driver drowsiness detection system to switch between a manual mode and an automatic mode, wherein the adaptive cruise control runs the vehicle using one or more of a plurality of sensors in the automatic mode, the automatic braking system controls the speed of the vehicle using information from the plurality of sensors, and the collision avoidance system diverts the vehicle from colliding with objects;
      classify the plurality of driving scenarios into one of a technology priority mode and a driver priority mode based on the analysis, the first score and the second score, wherein the technology priority mode indicates use of the driver assistance technology for running the vehicle in a driving scenario of the plurality of driving scenarios, and wherein the driver priority mode indicates the vehicle driven by the driver in the driving scenario of the plurality of driving scenarios without the usage of the driver assistance technology;
      alert the driver, by the processor based on detection of at least one of eye movement and a position of the driver to detect drowsiness by the driver drowsiness detection system; and
      provide recommendations, by the processor, based on the driver assistance technology and at least one of the plurality of driving scenarios, wherein the recommendations are provided based on aggregation of historical data, the historical data related to maintenance data sources and information from the manufacturer of the vehicle.

* * * * *